Patented Dec. 4, 1928.

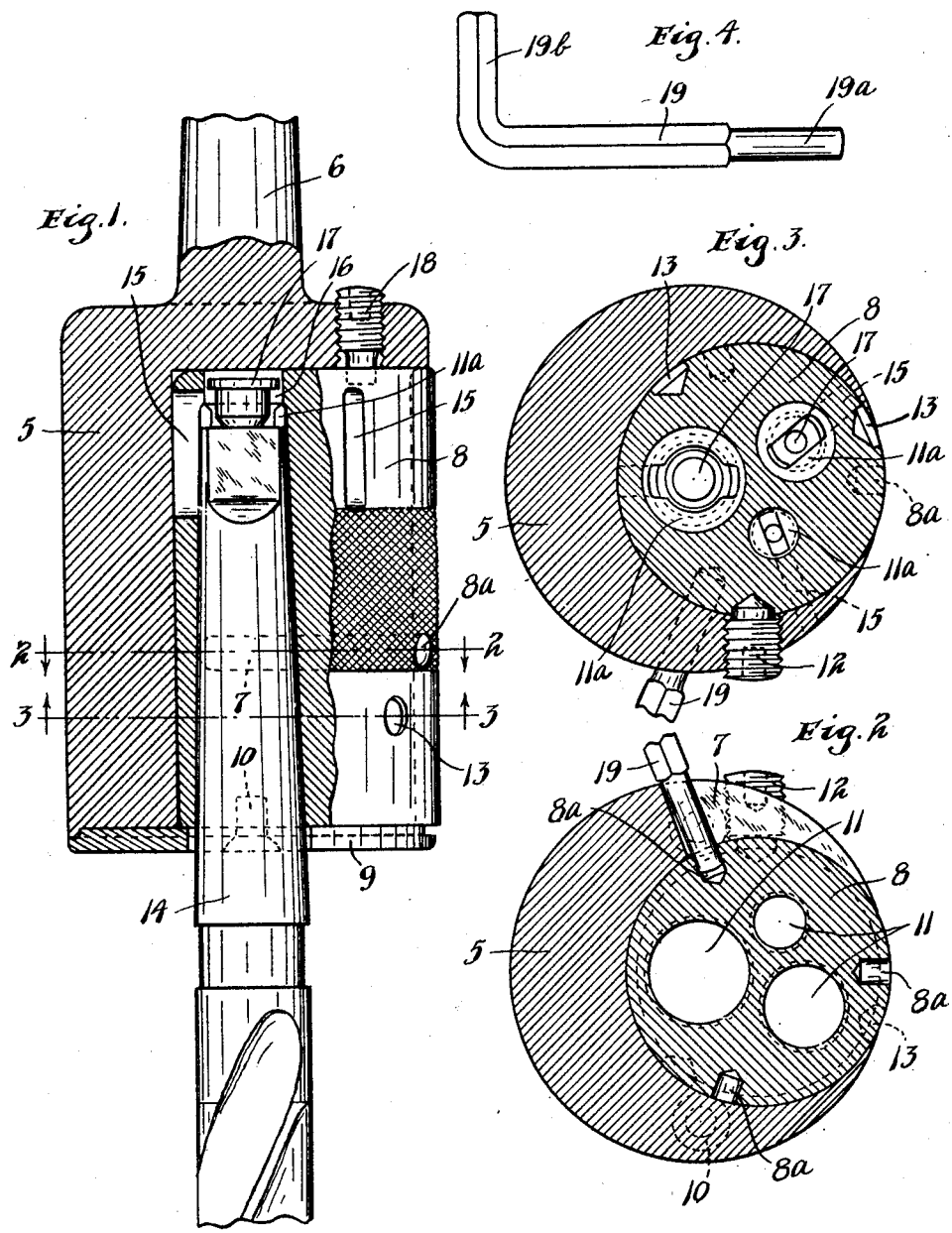

1,693,823

UNITED STATES PATENT OFFICE.

WILLIAM SHORE, OF MINNEAPOLIS, MINNESOTA.

DRILL CHUCK.

Application filed September 11, 1924. Serial No. 737,066.

This invention has for its main object to provide a rugged and compact chuck for drill presses, which will accommodate and hold drills of various sizes and which may be easily and quickly manipulated to engage a drill or release the same.

More specifically, it is an object in such a drill chuck to provide a compact head comprising a casing and an eccentrically aligned revoluble drill-holding cylinder therein having a plurality of shank sockets capable of being aligned with the axis of the head.

It is a further object to provide means for automatically aligning a desired drill socket in proper working position. An additional object in this device is to provide efficient means for ejecting a drill from any one of the shank sockets in case it has become tightly wedged therein.

A still additional feature of the invention is to provide such a drill chuck in which manipulation of the revoluble cylinder, as well as the ejecting device may be effected by a single tool or key of small size.

These and other objects and advantages of the invention will be apparent from the following description made in connection with the accompanying drawings, wherein like characters refer to similar parts throughout the several views, and in which, Fig. 1 is a view partly in side elevation and partly in section of the device with some parts broken away;

Fig. 2 is a horizontal section taken on the line 2—2 of Fig. 1, looking downwardly;

Fig. 3 is a horizontal section taken on the line 3—3 of Fig. 1, looking upwardly; and Fig. 4 is an enlarged elevation of the key or manipulating tool employed.

A rugged substantially cylindrical body member or casing 5 is provided having the usual upstanding attaching shank 6 in alignment therewith for connection with a drill brace. A cylindrical recess is bored from the bottom of casing 5 eccentrically aligned therewith and preferably having a circumference internally tangential to the circumference of said casing. A longitudinal slot is provided along the side of the casing about the line of tangency of the circumference of the recess with the circumference of the casing, and a circumferential slot 7 is provided at one side of said longitudinal slot communicating therewith and extending slightly less than one-fourth of the distance around said casing. A drill-holding cylinder 8 is disposed in said recess, capable of revolution therein and having a portion of its periphery extending through the longitudinal slot in casing 5 to permit access from the outside thereof, and is held in said recess by a bottom plate 9 secured to the bottom of cylinder 8 by small screws 10 and having an opening of slightly smaller diameter than said cylinder aligned with the axis thereof. The revoluble cylinder 8 is provided with a plurality of, preferably three, longitudinal drill sockets 11 having their several centers in the circumference of a circle centered about the axis of said cylinder, the circumference of said circle also passing through the axis of the casing 5 and attaching shank 6.

From this arrangement and structure, it may readily be seen that, by properly revolving the cylinder 8, any one of the drill sockets 11 may be precisely aligned with the axis of casing 5 in proper working position. To hold the cylinder in a desired aligned position, a set screw 12 is provided in the side of casing 5 engaging spaced sockets 13 in alignment therewith on the circumference of the cylinder. The drill sockets 11 are preferably longitudinally tapered to fit the standard drill shanks having, at their upper ends, shouldered portions or flanges 11ª adapted to accommodate the diminished flat ends of a drill 14. Radial slots 15 are provided in the periphery of the cylinder 8, near the top thereof, in respective alignment with the top portions 11ª of the sockets. Seats or recesses 16 are bored from the top of cylinder 8 in alignment with and communicating with the top of the respective sockets 11 and are adapted to hold flanged thumbs or ejecting members 17 capable of being projected into the top of sockets 11. A second set screw 18 is threaded into the top of casing 5 in alignment with a point on the circumference of the circle in which the centers of sockets 11 lie by which set screw the ejecting members 17 may be actuated, when the cylinder is revolved to align one of the same therewith. A plurality of circumferentially spaced holes, 8ª, there being one for each drill socket, is made on the periphery of cylinder 8, in alignment with the circumferential slot 7. These holes are adapted to receive the cylindrical end 19ª of a key or lever 19, which is adapted to be inserted through said slot 7 therein. This key, when circumferentially pulled to the extreme end of slot 7, the set screw 12 being released from engagement with one of the sockets 13, will precisely align one of the drill sockets 11 with the axis of the casing 5 and be in proper receptive position for the shank of a proper sized drill, the end of said slot limiting the swing of key 19. When a desired drill socket is thus aligned, one of the small sockets 13 will also be aligned with the set screw 12 for securing the cylinder in aligned position. The opposite end 19ᵇ of key 19 is preferably at right angles to the main portion of the key and of polygonal cross section adapted to be inserted in polygonal shaped sockets in the outer ends of the set screws 12 and 18, whereby leverage may be applied to the key to properly adjust said set screws.

Operation.

The operation is probably obvious from the foregoing description, but may be briefly summarized as follows:—

The set screw 12 is first released from engagement with cylinder 8 by means of the tool 19 when the cylindrical end 19ᵃ of said tool is inserted in one of the spaced holes 8ᵃ accessible through the longitudinal slot on said casing and the key then pulled to the end of the circumferential slot 7. This will align one of the drill sockets 11 with the axis of the drill chuck, which may be observed from the opening in the bottom plate 9. This operation may be repeated until the desired drill socket 11 is in proper alignment, when the set screw 12 will be turned with the end 19ᵇ of the key and the shank of the drill 14 inserted in said socket.

When it is wished to take out the drill 14, the set screw is first unscrewed and the cylinder 8 revolved by turning the same with the thumb through the longitudinal slot on casing 5 until the socket 11 engaging the drill is in alignment with the set screw 18. This alignment may be observed through one of the radial slots 15 in the side of cylinder 8. The set screw 18 is then screwed down with the end 19ᵇ of key 19, whereupon the ejecting member or thumb 17 will be projected downwardly and against the upper end of the drill shank ejecting the same from socket 11. The radial slots 15 are of such size and shape that wedge members may be inserted through, if necessary, in the customary manner to eject the drills, in case the ejecting members 17 cannot reach the ends of a short drill shank.

From the foregoing description, it is seen that the inventor has devised an extremely simple but highly efficient drill chuck capable of instantaneous adjustment to receive drills of various sizes. The chuck is ruggedly built and extremely compact having an outside diameter of only three inches and a height of approximately four and one-half inches. The standard drills, running from three-eighths of an inch to one and one-fourth inches in diameter, have but three different sized shanks, which shanks the sockets 11 are adapted to accommodate. This chuck, therefore, as illustrated in the preferred form, may be used on all drills within this range of sizes. The entire manipulation of the device may be affected, including the locking of the parts in alignment and ejecting of the drills by means of a single key or tool, thus minimizing the parts and rendering convenience to the operator.

The invention consists in extremely few parts, the essential ones being merely the casing and the drill-holding cylinder 8 revoluble therein, and the revolution of this cylinder by the automatic aligning means is the only requisite necessary to prepare the chuck for the reception of a desired size drill.

The device has been put to extensive shop usage and has been found very efficient for the purposes enumerated, meeting with wide accord by the users thereof.

At the present time, most drills in usage require separate sleeves to be employed in order that the drill may be inserted in a drill brace. Thus a sleeve is required for each sized drill. This invention obviously does away with the necessity of these several sleeves by providing the several sized sockets in which the shanks of the drills, themselves, are adapted to be seated.

It is to be understood that considerable changes may be made in the form, details and arrangement of parts, without departing from the scope of the invention.

What I claim is:—

1. A drill chuck comprising a substantially cylindrical body member, a revoluble cylinder having an eccentrically located drill socket disposed longitudinally of said cylinder, means by which said cylinder may be turned, and stop means on said body engageable by said first mentioned means to limit the movement of said cylinder, whereby said cylinder will be disposed in position to hold a drill substantially in axial alignment with said body member when said stop means is engaged.

2. A drill chuck comprising a substantially cylindrical body member, a revoluble cylinder eccentrically mounted therein, said cylinder having an eccentrically disposed drill socket axially disposed, a passage in said body member communicating with one end of said cylinder, means connectible with said cylinder by which said cylinder may be turned, and stop means on said body member engageable by said first mentioned means to limit the movement of said cylinder and to axially aline said drill socket with said passage.

3. A drill chuck comprising a substantially cylindrical body member, a revoluble cylinder eccentrically mounted therein having a longitudinally and eccentrically disposed drill socket, an arm connectible radially with said cylinder through a slot in said body and by which said cylinder may be turned through partial revolution, the movement of said arm being limited by the ends of said slot, whereby said drill socket will be axially alined with said body when said arm is in one extreme position.

4. A drill chuck comprising a substantially cylindrical body member, a revoluble cylinder mounted therein having an eccentrically and longitudinally disposed drill socket, means by which said cylinder may be turned, and means for limiting the movement of said first mentioned means, ejecting means adjacent one end of said body member disposed eccentrically of the axis thereof, said stop means adapted to cause said drill socket to be substantially alined with said ejecting means when said first mentioned means are moved to extreme position in one direction.

5. A drill chuck comprising a substantially cylindrical body member, a revoluble cylinder eccentrically mounted therein and having an eccentrically and longitudinally disposed drill socket, ejecting means carried by said body member and disposed eccentrically to the axis thereof, means by which said cylinder may be turned and means engageable by said first mentioned means for limiting the movement of said cylinder in both directions, whereby when moved to one extreme position, said drill socket will be alined with the axis of said body member and when moved to the opposite extreme position said drill socket will be alined with said ejecting means.

6. A drill chuck comprising a substantially cylindrical body member provided with an eccentrically alined cylindrical recess, a revoluble cylinder mounted in said recessed portion having an eccentrically and longitudinally disposed drill socket, an axial passage in the bottom of said body member communicating with one end of said cylinder, ejecting means adjacent the upper end of said body member disposed longitudinally and eccentrically of the axis of said body member, an arm radially connected with said cylinder said arm working through a slot in said body member, the ends of said slot limiting the movement of said arm in both directions whereby when said arm is moved to one extreme position said drill socket will be substantially alined with said axial passage in said body member and when moved to the opposite extreme position said drill socket will be substantially alined with said ejecting means.

7. A drill chuck comprising a casing, a revoluble cylinder mounted therein having an eccentrically and longitudinally disposed drill socket, a depressible member mounted in one end of said casing, an ejecting member mounted in one end of said drill socket, and means for alining said depressible member with said ejecting member.

In testimony whereof I affix my signature.

WILLIAM SHORE.